(12) United States Patent
Enomoto et al.

(10) Patent No.: US 6,369,955 B1
(45) Date of Patent: Apr. 9, 2002

(54) ZOOM LENS SYSTEM

(75) Inventors: Takashi Enomoto, Chiba; Hiroshi Nomura, Saitama; Takayuki Ito, Saitama; Shinichiro Ishii, Saitama, all of (JP)

(73) Assignee: Asahi Kogaku Kogyo Kabushiki Kaisha, Toyko (JP)

( * ) Notice: Subject to any disclaimer, the term of this patent is extended or adjusted under 35 U.S.C. 154(b) by 0 days.

(21) Appl. No.: 09/534,307

(22) Filed: Mar. 23, 2000

(30) Foreign Application Priority Data

Mar. 24, 1999 (JP) ............................................. 11-079572

(51) Int. Cl.[7] ............................................. G02B 15/14
(52) U.S. Cl. ...................... 359/685; 359/683; 359/684; 359/686; 359/689
(58) Field of Search ................................ 359/683, 684, 359/685, 686, 689, 691

(56) References Cited

U.S. PATENT DOCUMENTS 4,917,482 A    4/1990  Ito ............................. 359/690
4,984,877 A    1/1991  Ito ............................. 359/692
5,572,276 A   11/1996  Hirakawa .................... 359/684
6,028,714 A    2/2000  Koyama ...................... 359/683

FOREIGN PATENT DOCUMENTS

JP            8-146296        6/1996

*Primary Examiner*—Scott J. Sugarman
(74) *Attorney, Agent, or Firm*—Greenblum & Bernstein, P.L.C.

(57) ABSTRACT

A zoom lens system includes a plurality of lens groups being relatively moveable in order to vary the focal length, and at least one lens group is arranged to be a switching lens group which includes two or more sub-lens groups, and in which one sub-lens group is made moveable, along the optical axis, with respect to the other sub-lens group. In the first focal-length range of the zooming range of the zoom lens system, the moveable sub-lens group and the other sub-lens group maintain the first distance; and in the second focal-length range which covers the first focal-length range and a range different therefrom, the moveable sub-lens group and the other sub-lens group maintain the second distance which is different from the first one.

31 Claims, 9 Drawing Sheets

ZOOM LENS SYSTEM

BACKGROUND OF THE INVENTION

1. Field of the Invention

The present invention relates to a zoom lens system.

2. Description of the Related Art

In a zoom lens system of the prior art, contradictory demands for a high zoom ratio and miniaturization are required. For example, in a two-lens-group zoom lens system which can be miniaturized, if the paths of the lens groups thereof (hereinafter, lens-group-moving paths) are determined (i.e., solutions for lens-group-moving paths) so that the zoom ratio becomes high, interference of the lens group occurs on the telephoto side, or interference of a lens group and the image plane occurs at the wide-angle side. On the other hand, in a three-lens-group zoom lens system, the zoom ratio thereof can be made higher than that of a two-lens-group zoom lens system; however, miniaturization is difficult. Furthermore, if an attempt is made to obtain a higher zoom ratio, and if the power of these three lens groups is determined accordingly, precision on the operations of the system cannot be obtained due to the mechanical structure thereof.

SUMMARY OF THE INVENTION

It is an object of the present invention to provide a zoom lens system which is miniaturized and has a high zoom ratio.

According to the first aspect of the present invention, in a zoom lens system including a plurality of lens groups being relatively moveable in order to vary the focal length, at least one lens group is arranged to be a lens group (hereinafter, a switching lens group) which includes two or more sub-lens groups, and in which one sub-lens group is made moveable, along the optical axis, with respect to the other sub-lens group. In the first focal-length range of the zooming range of the zoom lens system, the moveable sub-lens group and the other sub-lens group maintain the first distance; and in the second focal-length range which covers the first focal-length range and a range different therefrom, the moveable sub-lens group and the other sub-lens group maintain the second distance which is different from the first one.

In the switching lens group, when the first distance is changed to the second distance, or vice versa, the distances among the switching lens group and other lens groups in the zoom lens system are varied. The number of the lens groups is preferably two or three. In the two-lens-group zoom lens system, the front or rear lens group can be the switching lens group. In the three-lens-group zoom lens system, the intermediate (second) lens group is preferably the switching lens group, though any one of lens groups can be the switching lens group. Furthermore, the switching lens group may function as a focusing lens group.

Also, a plurality of switching lens groups can be provided in the zoom lens system according to the present invention. In this case, a boundary focal length (i.e., a switching point) for changing the first distance to the second distance, may be set equally for all the switching lens groups, or set differently for each switching lens group.

According to another aspect of the present invention, in a zoom lens system including a plurality of lens groups being relatively moveable upon zooming, at least one lens group includes a plurality of sub-lens groups, one of which is made moveable, along the optical axis, to be selectively positioned at one of the extremities of a range within which the moveable sub-lens group is allowed to move, with respect to other sub-lens groups.

In a short-focal-length side zooming range covering the short focal length extremity over an intermediate focal length, the moveable sub-lens group is arranged to position at one of the extremities.

In a long-focal-length side zooming range covering the long focal length extremity over the intermediate focal length, the moveable sub-lens group is arranged to position at the other extremity.

Furthermore, the lens-group-moving paths of the lens group containing the plural sub-lens groups, and those of other lens groups are discontinued at the intermediate focal length. The zoom lens system is arranged to correctly form an image on the image plane in accordance with a position of the moveable sub-lens group. Being discontinued hereinafter means a path deflected like saw teeth, unlike a straight or smoothly curved path. Further, forming an image correctly hereinafter means that an image is formed on an image plane which is predeterminedly positioned.

According to still another aspect of the present invention, in a zoom lens system including a plurality of lens groups being relatively moveable in order to vary the focal length, at least one lens group is arranged to be the switching lens group which includes two or more sub-lens groups, and in which one sub-lens group is made moveable, along the optical axis, towards one of the object-side and image-plane-side extremities with respect to the other sub-lens group.

In the short-focal-length side zooming range covering the short focal length extremity over an intermediate focal length, the switching lens group and other lens groups are moved towards the object, and the distances thereamong are varied, while the moveable sub-lens group remains stationary at the object-side extremity.

At the intermediate focal length, the moveable sub-lens group is moved to the image-plane-side extremity, and at the same time, the switching lens group and other lens groups are respectively moved towards the image plane.

In the long-focal-length side zooming range covering the long focal length extremity over the intermediate focal length, the switching lens group and other lens groups are moved towards the object, and the distances thereamong are varied, while the moveable sub-lens group remains stationary at the image-plane-side extremity.

According to yet another aspect of the present invention, in a zoom lens system including a plurality of lens groups being relatively moveable in order to vary the focal length, a plurality of lens groups are arranged to be the switching lens groups, each of which includes two or more sub-lens groups. In each switching lens group, one sub-lens group is made moveable, along the optical axis, towards one of the object-side and image-plane-side extremities with respect to the other sub-lens group.

At the short focal length extremity, all the moveable sub-lens groups in the switching lens groups are positioned at the object-side extremity.

At a plurality of intermediate focal lengths between the short and long focal length extremities, the moveable sub-lens groups are moved, one by one, from the object-side extremity to the image-plane-side extremity, and at the same time, all the lens groups including the switching lens groups are moved towards the object.

The switching lens groups and other lens groups are moved towards the object in the following zooming ranges, while the distances among the lens groups are varied:

(i) from the short focal length extremity to the first intermediate focal length;
(ii) along a plurality of intermediate focal lengths; and
(iii) from the last intermediate focal length to the long focal length extremity.

All of the plural lens groups of the zoom lens system may be constituted as switching lens groups. In the case where a zoom lens system has two groups, the zoom lens system with a high zoom ratio and a simple structure can be obtained.

Embodiments according to the present invention will be discussed.

The zoom lens system of the first embodiment includes a negative first lens group, a positive second lens group and a negative third lens group, in this order from the object. The entire focal length of the zoom lens system is varied between the long and short focal length extremities by varying the distances among the lens groups. The first, second and third lens groups are moved along the following lens-group-moving paths:

[A] In the short-focal-length side zooming range covering the short focal length extremity over an intermediate focal length, the first, second and third lens groups move towards the object, while the first and second lens groups maintain the first distance therebetween, and while the distance between the third lens group and the integrally moved first and second lens groups is varied;

[B] At the intermediate focal length, the first and second lens groups are moved towards the image plane with respect to the long focal-length-side extremity of the short-focal-length side zooming range, and the first distance is made shorter; and the third lens group moves towards the image plane with respect to the long focal-length-side extremity of the short-focal-length side zooming range; and

[C] In the long-focal-length side zooming range covering the long focal length extremity over the intermediate focal length, the first, second and third lens groups move towards the object, while the second distance, which is shorter than the first distance, between the first and second lens groups is maintained, and while the distance between the third lens group and the integrally moved first and second lens groups is varied.

The zoom lens system of the second embodiment includes a positive first lens group, a negative second lens group, a positive third lens group and a negative fourth lens group, in this order from the object. The entire focal length of the zoom lens system is varied between the long and short focal length extremities by varying the distances among the lens groups. The first, second, third and fourth lens groups are moved along the following lens-group-moving paths:

[A] In the short-focal-length side zooming range covering the short focal length extremity over an intermediate focal length, the first, second, third and fourth lens groups move towards the object, while the second and third lens groups maintain the first distance therebetween, and while the distances among the first lens group, the integrally moved second and third lens groups, and the fourth lens group are varied;

[B] At the intermediate focal length, the second and third lens groups are moved towards the image plane with respect to the long focal-length-side extremity of the short-focal-length side zooming range, and the first distance is made shorter; and the first and fourth lens groups move towards the image plane with respect to the long focal-length-side extremity of the short-focal-length side zooming range; and

[C] In the long-focal-length side zooming range covering the long focal length extremity over the intermediate focal length, the first, second, third and fourth lens groups move towards the object, while the second distance, which is shorter than the first distance, between the second and third lens groups is maintained, and while the distances among the first lens group, the integrally moved second and third lens groups, and the fourth lens group are varied.

The zoom lens system of the third embodiment includes a negative first lens group, a negative second lens group, a positive third lens group and a negative fourth lens group, in this order from the object. The entire focal length of the zoom lens system is varied between the long and short focal length extremities by varying the distances among the lens groups. The first, second, third and fourth lens groups are moved along the following lens-group-moving paths:

[A] In the short-focal-length side zooming range covering the short focal length extremity over an intermediate focal length, the first, second, third and fourth lens groups move towards the object, while the second and third lens groups maintain the first distance therebetween, and while the distances among the first lens group, the integrally moved second and third lens groups, and the fourth lens group are varied;

[B] At the intermediate focal length, the second and third lens groups are moved towards the image plane with respect to the long focal-length-side extremity of the short-focal-length side zooming range, and the first distance is made shorter; and the first and fourth lens groups move towards the image plane with respect to the long focal-length-side extremity of the short-focal-length side zooming range; and

[C] In the long-focal-length side zooming range covering the long focal length extremity over the intermediate focal length, the first, second, third and fourth lens groups move towards the object, while the second distance, which is shorter than the first distance, between the second and third lens groups is maintained, and while the distances among the first lens group, the integrally moved second and third lens groups, and the fourth lens group are varied.

The zoom lens system of the fourth embodiment includes a negative first lens group, a positive second lens group, a positive third lens group and a negative fourth lens group, in this order from the object. The entire focal length of the zoom lens system is varied between the long and short focal length extremities by varying the distances among the lens groups. The first, second, third and fourth lens groups are moved along the following lens-group-moving paths:

[A] In the short-focal-length side zooming range covering the short focal length extremity over an intermediate focal length, the first and second lens groups maintain a longer distance therebetween, and the third and fourth lens groups maintain a longer distance therebetween; and the integrally moved first and second lens groups, and the integrally moved third and fourth lens groups are arranged to move towards the object while the distance therebetween is varied;

[B] At the intermediate focal length, the first and second lens groups are moved towards the image plane with respect to the long-focal-length side extremity of the short-focal-length side zooming range, and the longer distance therebetween is made shorter; and the third and fourth lens groups move towards the image plane with respect to the long-focal-length side extremity of the short-focal-length side zooming range, and the longer distance therebetween is made shorter; and

[C] In the long-focal-length side zooming range covering the long focal length extremity over the intermediate focal length, the first and second lens groups maintain the shorter distance, and the third and fourth lens groups maintain the shorter distance; and the integrally moved first and second lens groups, and the integrally moved third and fourth lens groups are arranged to move towards the object while the distance therebetween is varied.

The zoom lens system of the fifth embodiment includes a negative first lens group, a positive second lens group, a positive third lens group and a negative fourth lens group, in this order from the object. The entire focal length of the zoom lens system is varied between the long and short focal length extremities by varying the distances among the lens groups. The first, second, third and fourth lens groups are moved along the following lens-group-moving paths:

[A] In the short-focal-length side zooming range covering the short focal length extremity over the first intermediate focal length, the first and second lens groups maintain a longer distance, and the third and fourth lens groups maintain a longer distance; and the integrally moved first and second lens groups, and the integrally moved third and fourth lens groups are arranged to move towards the object while the distance therebetween is varied;

[B] At the first intermediate focal length, the first and second lens groups are moved towards the image plane with respect to the long-focal-length side extremity of the short-focal-length side zooming range, and the longer distance therebetween is made shorter; and the third and fourth lens groups integrally move towards the image plane;

[C] In an intermediate-focal-length zooming range covering the first intermediate focal length over the second intermediate focal length, the first and second lens groups maintain the shorter distance, and the third and fourth lens groups maintain the longer distance, and the integrally moved first and second lens groups, and the integrally moved third and fourth lens groups are arranged to move towards the object while the distance therebetween is varied;

[D] At the second intermediate focal length, the third and fourth lens groups move towards the image plane with respect to the long-focal-length side extremity of the intermediate-focal-length zooming range, and the longer distance therebetween is made shorter; and the first and second lens groups integrally move towards the image plane; and

[E] In the long-focal-length side zooming range covering the long focal length extremity over the second intermediate focal length, the first and second lens groups maintain the shorter distance, and the third and fourth lens groups maintain the shorter distance; and the integrally moved first and second lens groups, and the integrally moved third and fourth lens groups are arranged to move towards the object while the distance therebetween is varied.

The zoom lens system of the sixth embodiment includes a negative first lens group, a positive second lens group, a positive third lens group and a negative fourth lens group, in this order from the object. The entire focal length of the zoom lens system is varied between the long and short focal length extremities by varying the distances among the lens groups. The first, second, third and fourth lens groups are moved along the following lens-group-moving paths:

[A] In the short-focal-length side zooming range covering the short focal length extremity over the first intermediate focal length, the first and second lens groups maintain a longer distance therebetween, and the third and fourth lens groups maintain a longer distance therebetween; and the integrally moved first and second lens groups, and the integrally moved third and fourth lens groups are arranged to move towards the object while the distance therebetween is varied;

[B] At the first intermediate focal length, the third and fourth lens groups are moved towards the image plane with respect to the long focal-length-side extremity of the short-focal-length side zooming range, and the longer distance therebetween is made shorter; and the first and second lens groups integrally move towards the image plane;

[C] In an intermediate-focal-length zooming range covering the first intermediate focal length over the second intermediate focal length, the first and second lens groups maintain the longer distance therebetween, and the third and fourth lens groups maintain the shorter distance therebetween; and the integrally moved first and second lens groups, and the integrally moved third and fourth lens groups are arranged to move towards the object while the distance therebetween is varied;

[D] At the second intermediate focal length, the first and second lens groups move towards the image plane with respect to the long-focal-length side extremity of the intermediate-focal-length zooming range, and the longer distance therebetween is made shorter; and the third and fourth lens groups integrally move towards the image plane; and

[E] In the long-focal-length side zooming range covering the long focal length extremity over the second intermediate focal length, the first and second lens groups maintain the shorter distance therebetween, and the third and fourth lens groups maintain the shorter distance therebetween; and the integrally moved first and second lens groups, and the integrally moved third and fourth lens groups are arranged to move towards the object while the distance therebetween is varied.

The zoom lens system of the seventh embodiment includes a positive first lens group, a negative second lens group, a positive third lens group and a negative fourth lens group, in this order from the object. The entire focal length of the zoom lens system is varied between the long and short focal length extremities by varying the distances among the lens groups. The first, second, third and fourth lens groups are moved along the following lens-group-moving paths:

[A] In the short-focal-length side zooming range covering the short focal length extremity over an intermediate focal length, the first and second lens groups maintain a shorter distance therebetween, and the second and third lens groups maintain a longer distance therebetween; and the integrally moved first, second and third lens groups, and the fourth lens group are arranged to move towards the object while the distance therebetween is varied;

[B] At the intermediate focal length, the second lens group moves towards the image plane, and thereby the distance between the first and second lens groups is made longer, and the distance between the second and third lens groups is made shorter; and

[C] In the long-focal-length side zooming range covering the long focal length extremity over the intermediate focal length, the first and second lens groups maintain the longer distance, and the second and third lens groups maintain the shorter distance; and the integrally moved first, second and third lens groups, and the fourth lens group are arranged to move towards the object while the distance therebetween is varied.

It is practical to apply the zoom lens system of the present invention to a photographing lens system of a camera in which the photographing lens system and a finder optical system are independently provided. It is also practical to employ a plurality of focal-length steps which are determined in a stepwise manner along the lens-group-moving paths.

In the zoom lens system of the present invention, there are discontinuities along the lens-group-moving paths, and the movement of the moveable sub-lens groups is allowed at the intermediate focal lengths. Therefore as explained, the zoom lens system is preferably employed in a camera in which a finder optical system and a photographing optical system are independently provided, since if the zoom lens system were employed in a single lens reflex camera, the discontinuities of the lens-group-moving paths, and the change of an image due to the movement of lens groups are inevitably viewed. Due to the same reasons, positions at which the lens groups stop upon photographing are preferably provided in a stepwise manner along the lens-group-moving paths.

It is noted that, because of the aforementioned discontinuities and varying of distances, the switching lens groups of the invention do not necessarily fit within the ordinary meaning of an "N lens group" system (where N is a whole number).

For example, in the case of a lens having a switching lens group and one "conventional" lens group, the present disclosure characterizes, for the purposes of explanation, such a lens (i) as having a positive lens group (which is a switching lens group) and a negative lens group; (ii) as having a first lens group 10 (a switching lens group with first and second sub-lens groups S1 and S2) and a second lens group 20; (iii) as having negative, positive, and negative lens groups in order from the object; and (iv) as being two different two-lens-group systems for obtaining two different solutions. However, the use of the different characterizations is not inconsistent, and does not mean that a "switching lens group" according to the invention should be considered to be a conventional "lens group". The use of different characterizations emphasizes that the switching lens groups disclosed herein are different from ordinary "lens groups". As indicated, the same principle applies to the case of a lens having more than one switching lens groups and/or more than one "conventional" lens groups.

Accordingly, the claims and disclosure of the present application should be interpreted to be consistent with the meaning of "lens group"; "sub-lens group"; "switching lens group"; and "zooming lens group" as set forth herein where such terms would be inconsistent with the same terms as otherwise employed in the art.

BRIEF DESCRIPTION OF THE DRAWINGS

The invention will be discussed below in detail with reference to the accompanying drawings, in which.

DESCRIPTION OF THE PREFERRED EMBODIMENTS

Figure 1:
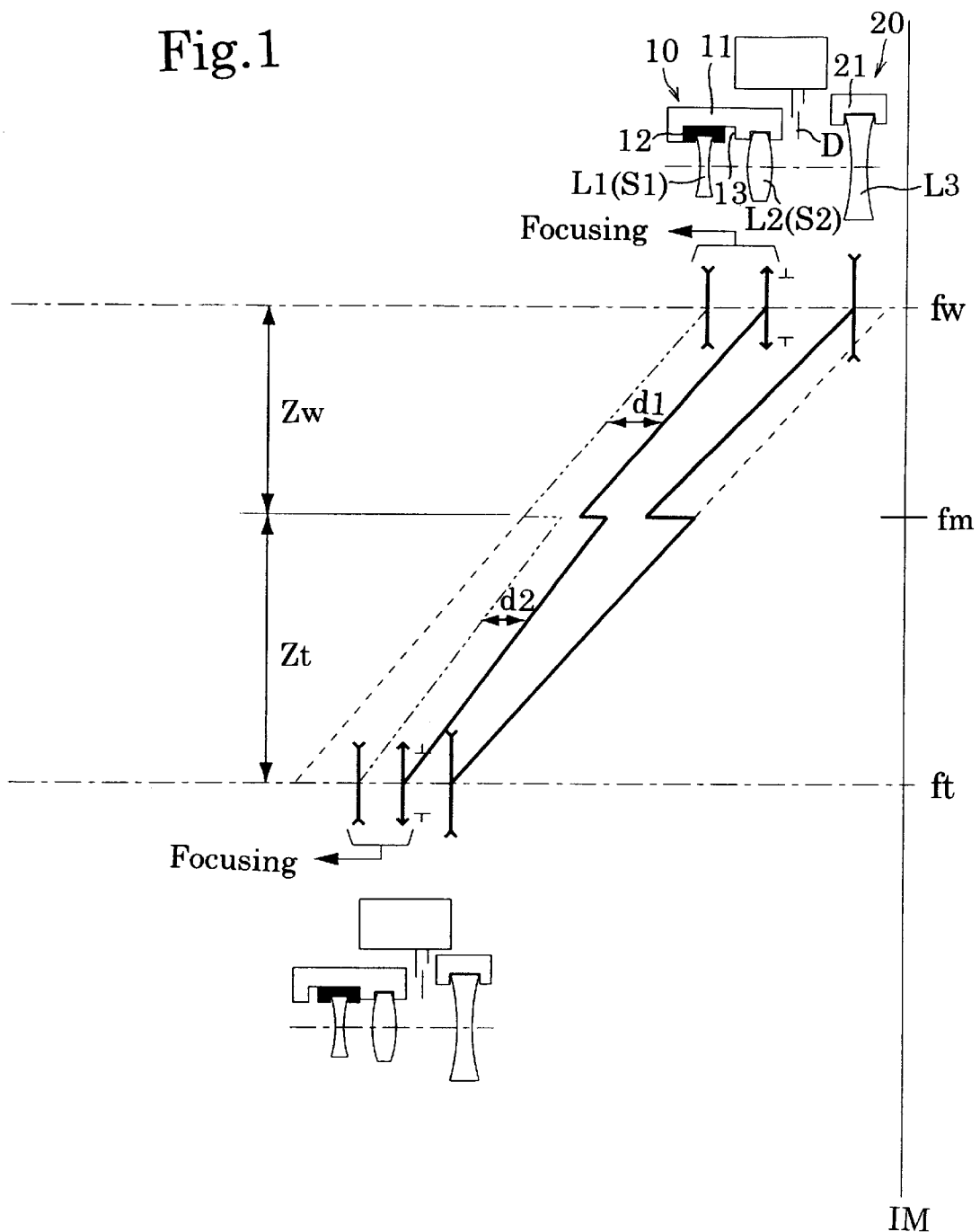
FIG. 1 shows the lens-group-moving paths of the first embodiment of the zoom lens system according to the present invention.

FIG. 1 shows the first embodiment of the zoom lens system. The zoom lens system includes a positive first lens group 10, and a negative second lens group 20, in this order from the object. The first lens group 10 includes a negative first lens group L1 (first sub-lens group S1) and a positive second lens group L2 (second sub-lens group S2), in this order from the object. The second lens group 20 includes a negative third lens group L3. The second sub-lens group S2 of the first lens group 10 is fixed to a first lens group frame 11. The first sub-lens group S1 is mounted on a moveable sub-lens group frame 12. The moveable sub-lens group frame 12 is arranged to move in the optical axis direction, by a predetermined distance, along a guide groove 13 which is formed on the first lens group frame 11. The first sub-lens group S1 is alternatively moved to either the object-side extremity at which the moveable sub-lens group frame 12 comes into contact with the front end of the guide groove 13, or the image-plane-side extremity at which the moveable sub-lens group frame 12 comes into contact with the rear end of the guide groove 13. The third lens group L3 is fixed to a second lens group frame 21. The diaphragm D is arranged to move together with the first lens group 10 (first lens group frame 11). Throughout FIGS. 1 to 9, IM indicates an image plane (film surface, and so forth) which is predeterminedly positioned.

The lens-group-moving paths according to the first embodiment enable the first lens group 10 (first lens group frame 11), the second lens group 20 (second lens group frame 21) and the first sub-lens group S1 (moveable sub-lens group frame 12) to move as follows:

[A] In a short-focal-length side zooming range Zw covering the short focal length extremity fw over an intermediate focal length fm, the first sub-lens group S1 and the second sub-lens group S2 maintain a distance d1 therebetween (the first distance: a longer distance); and the first lens group 10 (first lens group frame 11) and the second lens group 20 (second lens group frame 21) are arranged to move towards the object while the distance therebetween is varied;

[B] At the intermediate focal length fm, the first lens group 10 and the second lens group 20 move towards the image plane with respect to the long-focal-length side extremity of the short-focal-length side zooming range Zw; and the first sub-lens group S1 moves to the image-plane-side extremity of the guide groove 13, and thereby the distance d1 between the first sub-lens group S1 and the second sub-lens group S2 is made shorter to form a shorter distance d2 (the second distance: a shorter distance); and

[C] In a long-focal-length side zooming range Zt covering the long focal length extremity ft over the intermediate focal length fm, the first sub-lens group S1 and the second sub-lens group S2 maintain the shorter distance d2, and the first lens group 10 and the second lens group 20 move towards the object with respect to the positions thereof which are determined, at the intermediate focal length fm, after the lens groups being moved towards the image plane, while the distance between the first and second lens groups is varied.

The lens-group-moving paths for the first lens group 10 and the second lens group 20 are simply depicted as straight lines in FIG. 1. It should however be noted that actual lens-group-moving paths are not necessarily straight lines.

Focusing is performed by integrally moving the first sub-lens group S1 and the second sub-lens group S2, i.e., the first lens group 10 (first lens group frame 11) regardless of the zooming ranges.

The lens-group-moving paths have discontinuities at the intermediate focal length fm; however, by adequately determining the positions of the first sub-lens group S1, the second sub-lens group S2 and the third lens group L3 respectively at the short focal length extremity fw, the intermediate focal length fm (discontinuity) and the long focal length extremity ft, solutions by which an image is correctly formed can be obtained. According to the lens-group-moving paths with the solutions, a zoom lens system which is miniaturized and has a high zoom ratio can be obtained.

The existence of solutions for the lens-group-moving paths of the first embodiment can be explained by, for example, the following discussions:

The zoom lens system of the first embodiment can be divided into a negative lens group, a positive lens group, and a negative lens group, in this order from the object. Here, the negative and the positive lens groups on the object side (i.e., the first sub-lens group S1 and the second sub-lens group S2) are considered to be a positive front lens group (the first lens group 10) in which the relative position of the negative and positive lens groups is fixed respectively at the long focal length extremity ft and at the short focal length extremity fw. In this case, since the distance between the first sub-lens group S1 and the second sub-lens group S2 is longer at the short focal length extremity fw than at the long focal length extremity ft (d1>d2), the focal length Pt of the first lens group 10 at the long focal length extremity ft is longer than the focal length Pw thereof at the short focal length extremity fw, i.e., Pt>Pw. In other words, according to the position of the first lens group 10, the following two 'two-lens-group' zoom lens systems can be considered:

(i) a two-lens-group zoom lens system including the first lens group 10 in which the first sub-lens group S1 and the second sub-lens group S2 maintain a longer distance therebetween at the focal length Pw, and the second lens group 20; or (ii) a two-lens-group zoom lens system including the first lens group 10 in which the first sub-lens group S1 and the second sub-lens group S2 maintain a shorter distance therebetween at the focal length Pt, and the second lens group 20. Therefore a solution for each zoom lens system can be obtained. More concretely, one of the two solutions is the lens-group-moving paths in the short-focal-length side zooming range Zw, and the other solution is the lens-group-moving paths in the long-focal-length side zooming range Zt. However, at the intermediate focal length fm, these paths are discontinued, and the distance between the negative and the positive lens groups in the front lens group is not the same as the above-described distances d1 and d2. It should be understood that though the movement of the lens groups upon zooming is substantially the same as that of a two-lens-group zoom lens system, a miniaturized zoom lens system with a high zoom ratio can be obtained by (i) providing the discontinuities along the lens-group-moving paths for the first lens group 10 and the second lens group 20 at the intermediate focal length fm, and (ii) by varying the distance between the negative and the positive lens groups in the front lens group. The above is discussed for the first embodiment; however, the discussions are also applicable for other embodiments by replacing the term of two-lens-group zoom lens system with that of three-lens-group zoom lens system.

Figure 2:
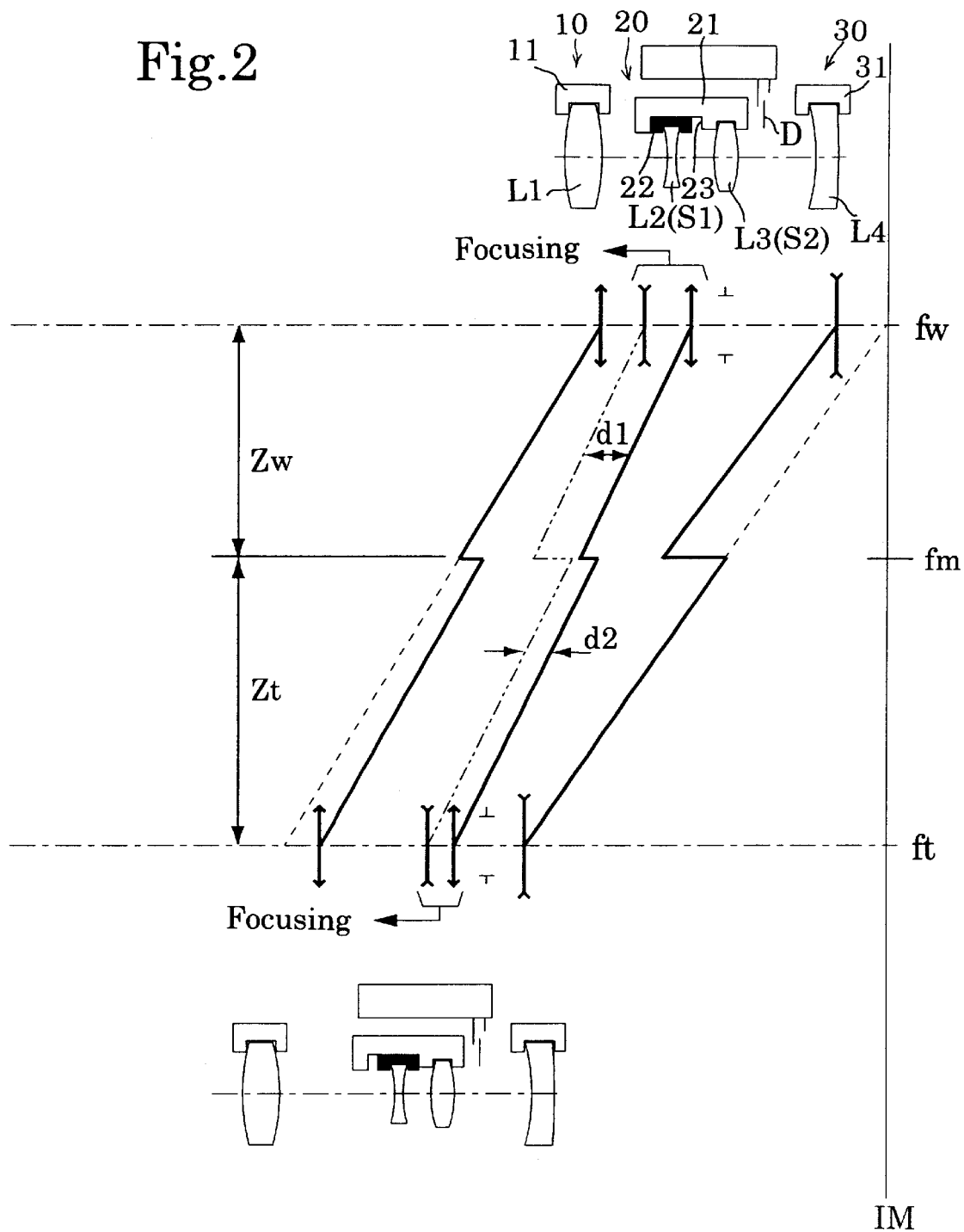
FIG. 2 shows the lens-group-moving paths of the second embodiment of the zoom lens system according to the present invention.

FIG. 2 shows the second embodiment of the zoom lens system. The zoom lens system includes a positive first lens group 10, a positive second lens group 20 and a negative third lens group 30, in this order from the object. The first lens group 10 includes a positive first lens group L1. The second lens group 20 includes a negative second lens group L2 (first sub-lens group S1) and a positive third lens group L3 (second sub-lens group S2), in this order from the object. The third lens group 30 includes a negative fourth lens group L4. The first lens group L1 is fixed to a first lens group frame 11. The second sub-lens group S2 of the second lens group 20 is fixed to a second lens group frame 21. The first sub-lens group S1 is mounted on a moveable sub-lens group frame 22. The moveable sub-lens group frame 22 is arranged to move, in the optical axis direction, by a predetermined distance, along a guide groove 23 which is formed on the first lens group frame 21. The first sub-lens group S1 is alternatively moved to either the object-side extremity at which the moveable sub-lens group frame 22 comes into contact with the front end of the guide groove 23, or the image-plane-side extremity at which the moveable sub-lens group frame 22 comes into contact with the rear end of the guide groove 23. The fourth lens group L4 is fixed to a third lens group frame 31. The diaphragm D is arranged to move together with the second lens group 20 (second lens group frame 21).

The lens-group-moving paths according to the second embodiment enable the first lens group 10 (first lens group frame 11), the second lens group 20 (second lens group frame 21), the third lens group 30 (third lens group frame 31) and the first sub-lens group S1 (moveable sub-lens group frame 22) to move as follows:

[A] In a short-focal-length side zooming range Zw covering the short focal length extremity fw over an intermediate focal length fm, the first sub-lens group S1 and the second sub-lens group S2 maintain a distance d1 (the first distance: a longer distance); and the first lens group 10 (first lens group frame 11), the second lens group 20 (second lens group frame 21) and the third lens group 30 (third lens group frame 31) are arranged to move towards the object while the distances thereamong are varied;

[B] At the intermediate focal length fm, the first lens group 10, the second lens group 20 and the third lens 15 group 30 are moved towards the image plane with respect to the long focal-length-side extremity of the short-focal-length side zooming range Zw; and the first sub-lens group S1 moves to the image-plane-side extremity of the guide groove 23, and thereby the distance d1 between the first sub-lens group S1 and the second sub-lens group S2 is made shorter to form a shorter distance d2 (the second distance: a shorter distance); and

[C] In a long-focal-length side zooming range Zt covering the long focal length extremity ft over the intermediate focal length fm, the first sub-lens group S1 and the second sub-lens group S2 maintain the shorter distance d2; and the first lens group 10, the second lens group 20 and third lens group 30 move towards the object with respect to the positions thereof which are determined, at the intermediate focal length fm, after the lens groups being moved towards the image plane, while the distances thereamong are varied.

The lens-group-moving paths for the first lens group 10, the second lens group 20 and the third lens group 30 are simply depicted as straight lines in FIG. 2. It should however be noted that actual lens-group-moving paths are not necessarily straight lines.

Focusing is performed by integrally moving the first sub-lens group S1 and the second sub-lens group S2, i.e., the second lens group 20 (second lens group frame 21) regardless of the zooming ranges.

The lens-group-moving paths have discontinuities at the intermediate focal length fm, as the first embodiment; however, by adequately determining the positions of the first lens group L1, the first sub-lens group S1 (second lens group L2) and the second sub-lens group S2 (third lens group L3) and the fourth lens group L4 respectively at the short focal length extremity fw, the intermediate focal length fm (discontinuity) and the long focal length extremity ft, solutions by which an image is correctly formed can be obtained. According to the lens-group-moving paths with the solutions, a zoom lens system which is miniaturized and has a high zoom ratio can be obtained.

Figure 3:
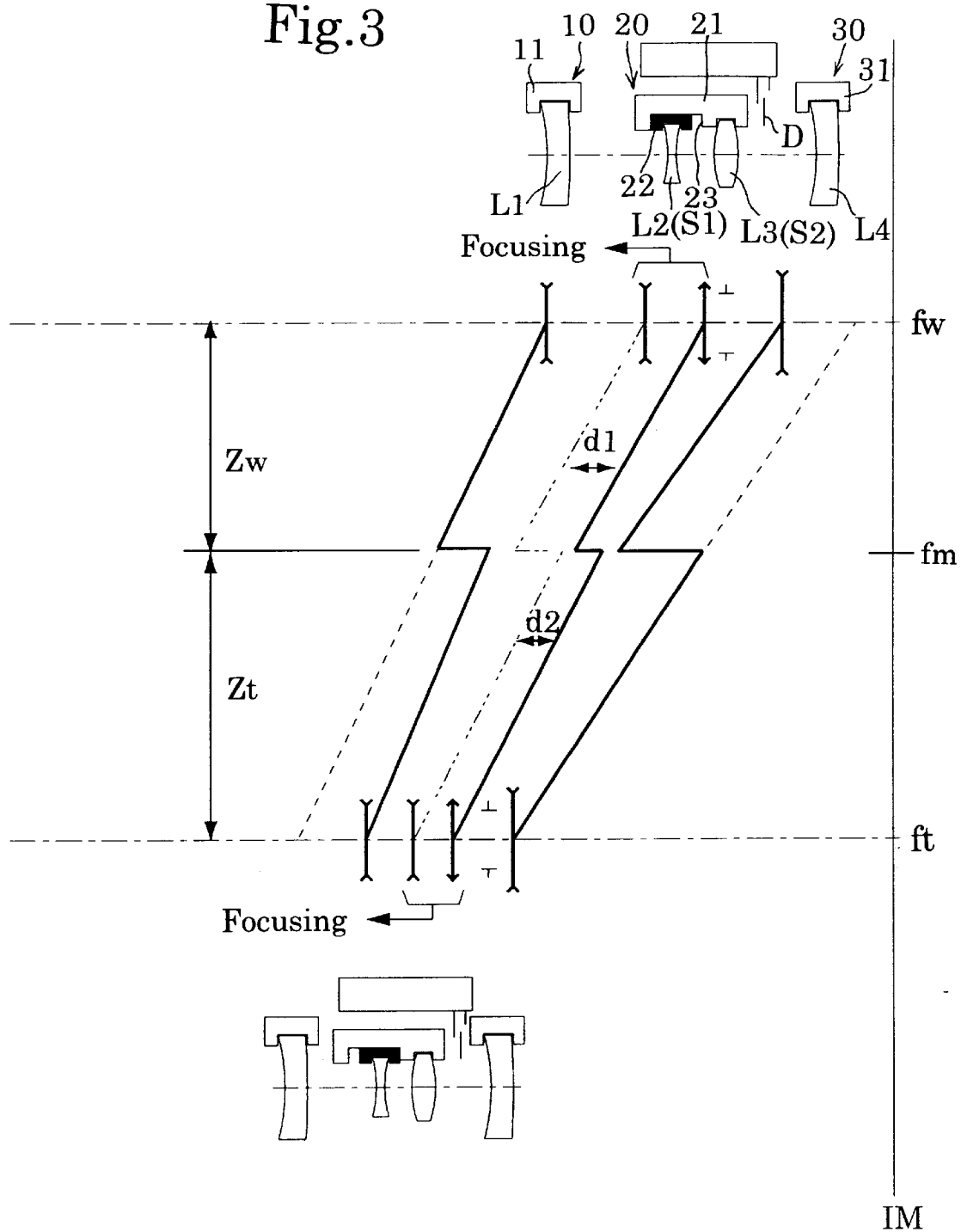
FIG. 3 shows the lens-group-moving paths of the third embodiment of the zoom lens system according to the present invention.

FIG. 3 shows the third embodiment of the zoom lens system. In the this embodiment, the first lens group L1 is arranged to have negative power, which is the only difference compared with the second embodiment. Except this point, the third embodiment is substantially the same as the second embodiment.

Figure 4:
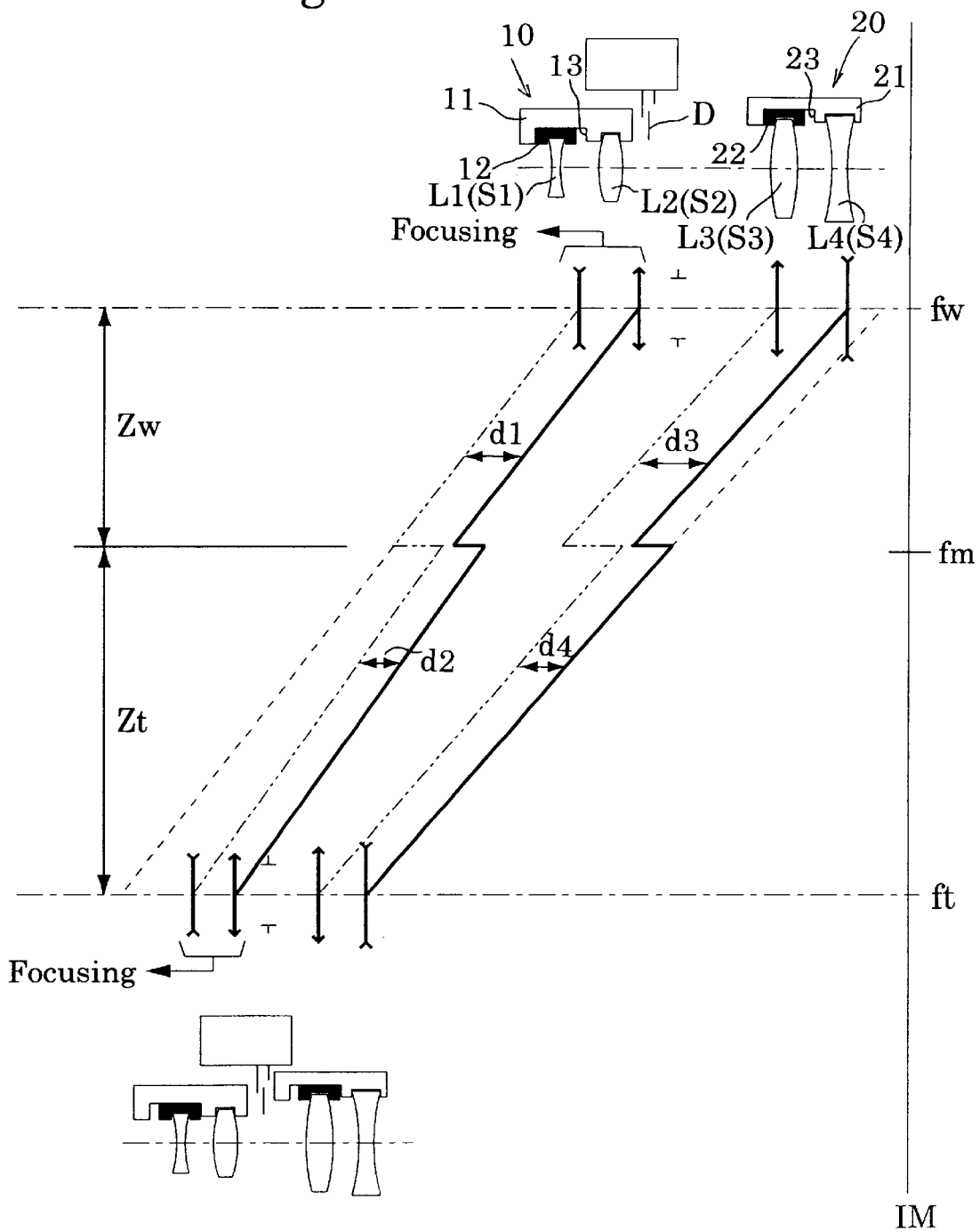
FIG. 4 shows the lens-group-moving paths of the fourth embodiment of the zoom lens system according to the present invention.

FIG. 4 shows the fourth embodiment of the zoom lens system. The zoom lens system includes a positive first lens group 10, and a negative second lens group 20, in this order from the object. The first lens group 10 includes a negative first lens group L1 (first sub-lens group S1) and a positive second lens group L2 (second sub-lens group S2), in this order from the object. The second lens group 20 includes a positive third lens group L3 (third sub-lens group S3) and a negative fourth lens group L4 (fourth sub-lens group S4), in this order from the object.

The second sub-lens group S2 of the first lens group 10 is fixed to a first lens group frame 11. The first sub-lens group S1 is mounted on a moveable sub-lens group frame 12. The moveable sub-lens group frame 12 is arranged to move in the optical axis direction, by a predetermined distance, along a guide groove 13 which is formed on the first lens group frame 11. The first sub-lens group S1 is alternatively moved to either the object-side extremity at which the moveable sub-lens group frame 12 comes into contact with the front end of the guide groove 13, or the image-plane-side extremity at which the moveable sub-lens group frame 12 comes into contact with the rear end of the guide groove 13. Similarly, the fourth sub-lens group S4 of the second lens group 20 is fixed to a second lens group frame 21. The third sub-lens group S3 is mounted on a moveable sub-lens group frame 22. The moveable sub-lens group frame 22 is arranged to move in the optical axis direction, by a predetermined distance, along a guide groove 23 which is formed on the second lens group frame 21. The third sub-lens group S3 is alternatively moved to either the object-side extremity at which the moveable sub-lens group frame 22 comes into contact with the front end of the guide groove 23, or the image-plane-side extremity at which the moveable sub-lens group frame 22 comes into contact with the rear end of the guide groove 23. The diaphragm D is arranged to move together with the first lens group 10 (first lens group frame 11).

The lens-group-moving paths according to the fourth embodiment enable the first lens group 10 (first lens group frame 11), the second lens group 20 (second lens group frame 21), the first sub-lens group S1 and the third sub-lens group S3 to move as follows:

[A] In a short-focal-length side zooming range Zw covering the short focal length extremity fw over an intermediate focal length fm, the first sub-lens group S1 and the second sub-lens group S2 maintain a distance d1 therebetween (the first distance: a longer distance), and the third sub-lens group S3 and the fourth sub-lens group S4 maintain a distance d3 therebetween (the first distance: a longer distance); and the first lens group 10 (first lens group frame 11) and the second lens group 20 (second lens group frame 21) are arranged to move towards the object while the distance therebetween is varied;

[B] At the intermediate focal length fm, the first lens group 10 and the second lens group 20 are moved towards the image plane with respect to the long focal-length-side extremity of the short-focal-length side zooming range Zw; and the first sub-lens group S1 moves to the image-plane-side extremity of the guide groove 13, and thereby the distance d1 between the first sub-lens group S1 and the second sub-lens group S2 is made shorter to form a shorter distance d2 (the second distance: a shorter distance), and also the distance d3 between the third sub-lens group S3 and the fourth sub-lens group S4 is made shorter to form a shorter distance d4 (the second distance: a shorter distance); and

[C] In a long-focal-length side zooming range Zt covering the long focal length extremity ft over the intermediate focal length fm, the first sub-lens group S1 and the second sub-lens group S2 maintain the shorter distance d2 therebetween, and the third sub-lens group S3 and the fourth sub-lens group S4 maintain the shorter distance d4 therebetween; and the first lens group 10 and the second lens group 20 move towards the object with respect to the positions thereof which are determined, at the intermediate focal length fm, after the lens groups being moved towards the image plane, while the distance therebetween is varied.

The lens-group-moving paths for the first lens group 10 and the second lens group 20 are simply depicted as straight lines in FIG. 4. It should however be noted that actual lens-group-moving paths are not necessarily straight lines.

Focusing is performed by integrally moving the first sub-lens group S1 and the second sub-lens group S2, i.e., the first lens group 10 (first lens group frame 11) regardless of the zooming ranges.

Similar to the first through third embodiments, the lens-group-moving paths have discontinuities at the intermediate focal length fm; however, by adequately determining the positions of the first sub-lens group S1 (first lens group L1), the second sub-lens group S2 (second lens group L2), the third sub-lens group S3 (third lens group L3) and the fourth sub-lens group S4 (fourth lens group L4) respectively at the short focal length extremity fw, the intermediate focal length fm (discontinuity) and the long focal length extremity ft, solutions by which an image is correctly formed can be obtained. According to the lens-group-moving paths with the solutions, a zoom lens system which is miniaturized and has a high zoom ratio can be obtained.

Figure 5:
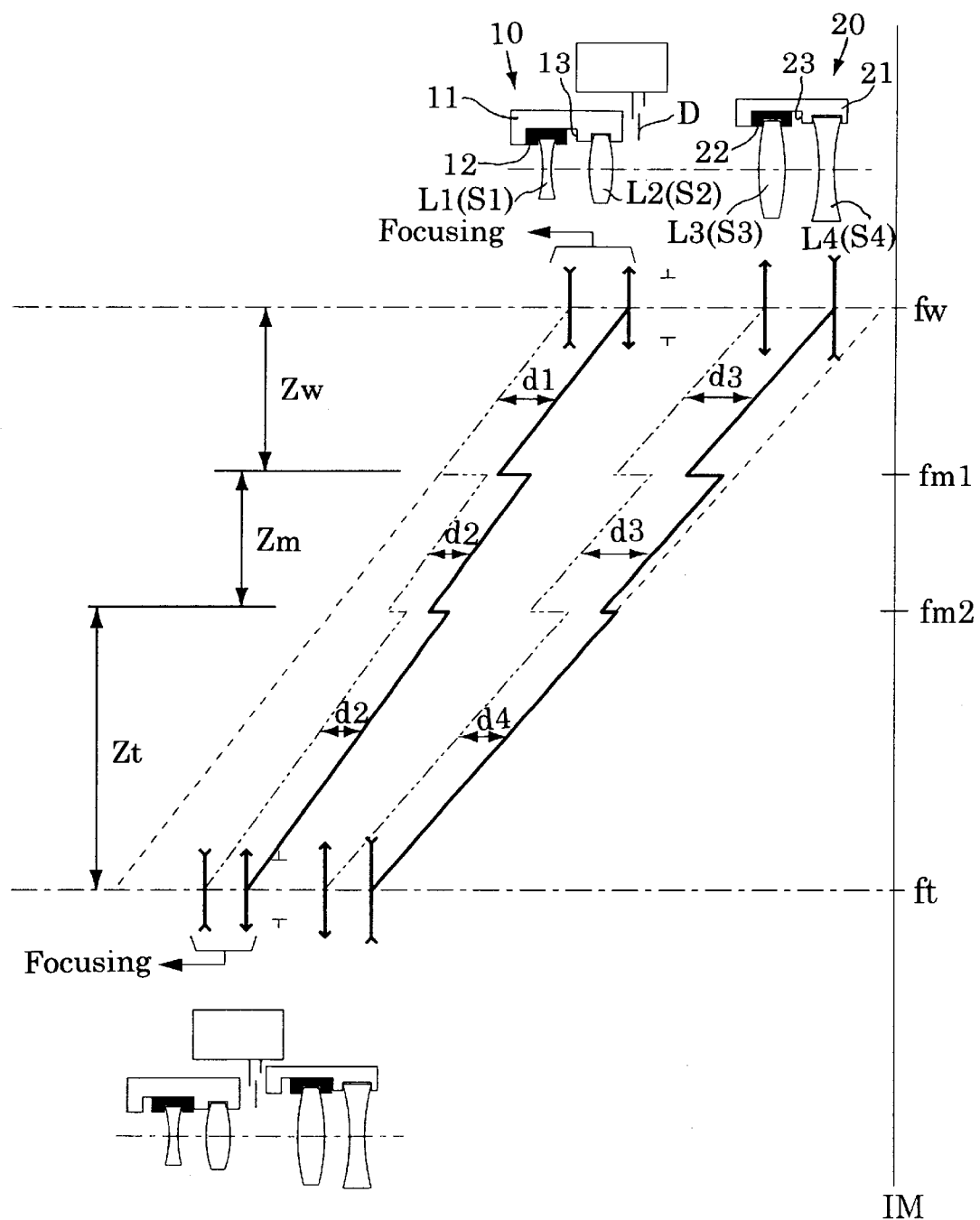
FIG. 5 shows the lens-group-moving paths of the fifth embodiment of the zoom lens system according to the present invention.

FIG. 5 shows the fifth embodiment of the zoom lens system. The zoom lens system includes a positive first lens group 10, and a negative second lens group 20, in this order from the object. The first lens group 10 includes a negative first lens group L1 (first sub-lens group S1) and a positive second lens group L2 (second sub-lens group S2), in this order from the object. The second lens group 20 includes a positive third lens group L3 (third sub-lens group S3) and a negative fourth lens group L4 (fourth sub-lens group S4), in this order from the object.

The second sub-lens group S2 of the first lens group 10 is fixed to a first lens group frame 11. The first sub-lens group S1 is mounted on a moveable sub-lens group frame 12. The moveable sub-lens group frame 12 is arranged to move in the optical axis direction, by a predetermined distance, along a guide groove 13 which is formed on the first lens group frame 11. The first sub-lens group S1 is alternatively moved to either the object-side extremity at which the moveable sub-lens group frame 12 comes into contact with the front end of the guide groove 13, or the image-plane-side extremity at which the moveable sub-lens group frame 12 comes into contact with the rear end of the guide groove 13. Similarly, the fourth sub-lens group S4 of the second lens group 20 is fixed to a second lens group frame 21. The third sub-lens group S3 is mounted on a moveable sub-lens group frame 22. The moveable sub-lens group frame 22 is arranged to move in the optical axis direction, by a predetermined distance, along a guide groove 23 which is formed on the second lens group frame 21. The third sub-lens group S3 is alternatively moved to either the object-side extremity at which the moveable sub-lens group frame 22 comes into contact with the front end of the guide groove 23, or the image-plane-side extremity at which the moveable sub-lens group frame 22 comes into contact with the rear end of the guide groove 23. The diaphragm D is arranged to move together with the first lens group 10 (first lens group frame 11).

The lens-group-moving paths according to the fifth embodiment enable the first lens group 10 (first lens group frame 11), the second lens group 20 (second lens group frame 21), the first sub-lens group S1 and the third sub-lens group S3 to move as follows:

[A] In a short-focal-length side zooming range Zw covering the short focal length extremity fw over a first intermediate focal length fm1, the first sub-lens group S1 and the second sub-lens group S2 maintain a distance d1 therebetween (the first distance: a longer distance), and the third sub-lens group S3 and the fourth sub-lens group S4 maintain a distance d3 therebetween (the first distance: a longer distance); and the first lens group 10 (first lens group frame 11) and the second lens group 20 (second lens group frame 21) are arranged to move towards the object while the distance therebetween is varied;

[B] At the first intermediate focal length fm1, the first lens group 10 and the second lens group 20 are moved towards the image plane with respect to the long focal-length-side extremity of the short-focal-length side zooming range Zw; and the first sub-lens group S1 moves to the image-plane-side extremity of the guide groove 13, and thereby the distance d1 between the first sub-lens group S1 and the second sub-lens group S2 is made shorter to form a shorter distance d2 (the second distance: a shorter distance);

[C] In an intermediate zooming range Zm covering the first intermediate focal length fm1 over a second intermediate focal length fm2, the first sub-lens group S1 and the second sub-lens group S2 maintain the shorter distance d2, and the third sub-lens group S3 and the fourth sub-lens group S4 maintain the longer distance d3; and the first lens group 10 and the second lens group 20 move towards the object with respect to the positions thereof which are determined, at the first intermediate focal length fm1, after the lens groups being moved towards the image plane, while the distance therebetween is varied;

[D] At the second intermediate focal length fm2, the first lens group 10 and the second lens group 20 are moved towards the image plane with respect to the long focal-length-side extremity of the intermediate zooming range Zm; and the third sub-lens group S3 moves to the image-plane-side extremity of the guide groove 23, and thereby the distance d3 between the third sub-lens group S3 and the fourth sub-lens group S4 is made shorter to form a shorter distance d4 (the second distance: a shorter distance); and

[E] In a long-focal-length side zooming range Zt covering the long focal length extremity ft over the second intermediate focal length fm2, the first sub-lens group S1 and the second sub-lens group S2 maintain the shorter distance d2 therebetween, and the third sub-lens group S3 and the fourth sub-lens group S4 maintain the shorter distance d4 therebetween; and the first lens group 10 and the second lens group 20 move towards the object with respect to the positions thereof which are determined, at the second intermediate focal length fm2, after the lens groups being moved towards the image plane, while the distance therebetween is varied.

The lens-group-moving paths for the first lens group 10 and the second lens group 20 are simply depicted as straight lines in FIG. 5. It should however be noted that actual lens-group-moving paths are not necessarily straight lines.

Focusing is performed by integrally moving the first sub-lens group S1 and the second sub-lens group S2, i.e., the first lens group 10 (first lens group frame 11) regardless of the zooming ranges.

Similar to the first through fourth embodiments, the lens-group-moving paths have discontinuities at the first intermediate focal length fm1 and the second intermediate focal length fm2; however, by adequately determining the positions of the first sub-lens group S1 (first lens group L1), the second sub-lens group S2 (second lens group L2), the third sub-lens group S3 (third lens group L3) and the fourth sub-lens group S4 (fourth lens group L4) respectively at the short focal length extremity fw, the first and second intermediate focal lengths fm1, fm2 (discontinuities), and the long focal length extremity ft, solutions by which an image is correctly formed can be obtained. According to the lens-group-moving paths with the solutions, a zoom lens system which is miniaturized and has a high zoom ratio can be obtained.

Figure 6:
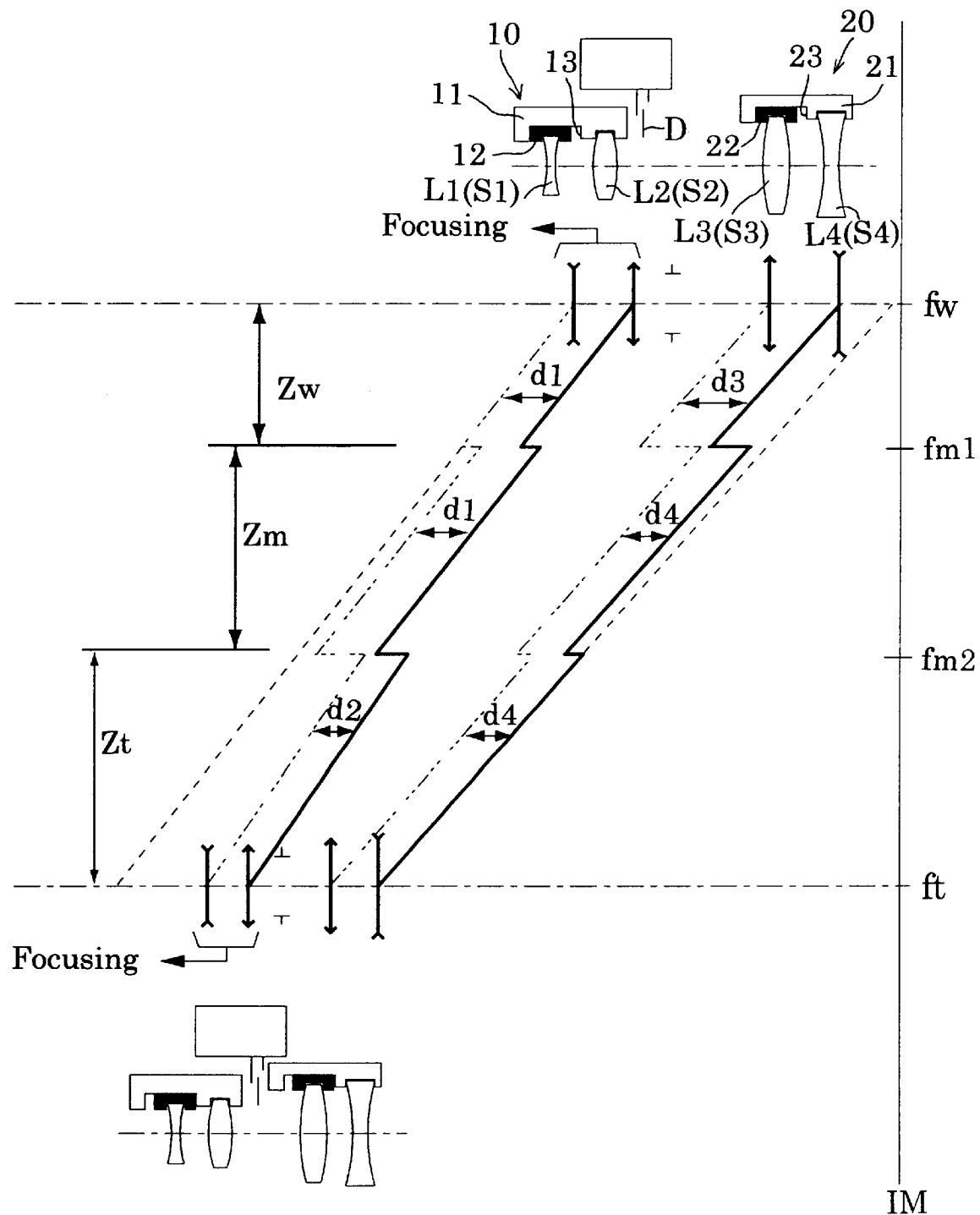
FIG. 6 shows the lens-group-moving paths of the sixth embodiment of the zoom lens system according to the present invention.

FIG. 6 shows the sixth embodiment of the zoom lens system. The zoom lens system includes a positive first lens group 10, and a negative second lens group 20, in this order from the object. The first lens group 10 includes a negative first lens group L1 (first sub-lens group S1) and a positive second lens group L2 (second sub-lens group S2), in this order from the object. The second lens group 20 includes a positive third lens group L3 (third sub-lens group S3) and a negative fourth lens group L4 (fourth sub-lens group S4), in this order from the object.

The second sub-lens group S2 of the first lens group 10 is fixed to a first lens group frame 11. The first sub-lens group S1 is mounted on a moveable sub-lens group frame 12. The moveable sub-lens group frame 12 is arranged to move in the optical axis direction, by a predetermined distance, along a guide groove 13 which is formed on the first lens group frame 11. The first sub-lens group S1 is alternatively moved to either the object-side extremity at which the moveable sub-lens group frame 12 comes into contact with the front end of the guide groove 13, or the image-plane-side extremity at which the moveable sub-lens group frame 12 comes into contact with the rear end of the guide groove 13. Similarly, the fourth sub-lens group S4 of the second lens group 20 is fixed to a second lens group frame 21. The third sub-lens group S3 is mounted on a moveable sub-lens group frame 22. The moveable sub-lens group frame 22 is arranged to move in the optical axis direction, by a predetermined distance, along a guide groove 23 which is formed on the second lens group frame 21. The third sub-lens group S3 is alternatively moved to either the object-side extremity at which the moveable sub-lens group frame 22 comes into contact with the front end of the guide groove 23, or the image-plane-side extremity at which the moveable sub-lens group frame 22 comes into contact with the rear end of the guide groove 23. The diaphragm D is arranged to move together with the first lens group 10 (first lens group frame 11).

The lens-group-moving paths according to the sixth embodiment enable the first lens group 10 (first lens group frame 11), the second lens group 20 (second lens group frame 21), the first sub-lens group S1 and the third sub-lens group S3 to move as follows:

[A] In a short-focal-length side zooming range Zw covering the short focal length extremity fw over a first intermediate focal length fm1, the first sub-lens group S1 and the second sub-lens group S2 maintain a distance d1 therebetween (the first distance: a longer distance), and the third sub-lens group S3 and the fourth sub-lens group S4 maintain a distance d3 therebetween (the first distance: a longer distance); and the first lens group 10 (first lens group frame 11) and the second lens group 20 (second lens group frame 21) are arranged to move towards the object while the distance therebetween is varied;

[B] At the first intermediate focal length fm1, the first lens group 10 and the second lens group 20 are moved towards the image plane with respect to the long focal-length-side extremity of the short-focal-length side zooming range Zw; and the third sub-lens group S3 moves to the image-plane-side extremity of the guide groove 23, and thereby the distance d3 between the third sub-lens group S3 and the fourth sub-lens group S4 is made shorter to form a shorter distance d4 (the second distance: a shorter distance);

[C] In an intermediate zooming range Zm covering the first intermediate focal length fm1 over a second intermediate focal length fm2, the first sub-lens group S1 and the second sub-lens group S2 maintain the longer distance d1 therebetween, and the third sub-lens group S3 and the fourth sub-lens group S4 maintain the shorter distance d4 therebetween; and the first lens group 10 and the second lens group 20 move towards the object with respect to the positions thereof which are determined, at the first intermediate focal length fm1, after the lens groups being moved towards the image plane, while the distance therebetween is varied;

[D] At the second intermediate focal length fm2, the first lens group 10 and the second lens group 20 are moved towards the image plane with respect to the long focal-length-side extremity of the intermediate zooming range Zm; and the first sub-lens group S1 moves to the image-plane-side extremity of the guide groove 13, and thereby the distance d1 between the first sub-lens group S1 and the second sub-lens group S2 is made shorter to form a shorter distance d2 (the second distance: a shorter distance); and

[E] In a long-focal-length side zooming range Zt covering the long focal length extremity ft over the second intermediate focal length fm2, the first sub-lens group S1 and the second sub-lens group S2 maintain the shorter distance d2 therebetween, and the third sub-lens group S3 and the fourth sub-lens group S4 maintain the shorter distance d4 therebetween; and the first lens group 10 and the second lens group 20 move towards the object with respect to the positions thereof which are determined, at the second intermediate focal length fm2, after the lens groups being moved towards the image plane, while the distance therebetween is varied.

The lens-group-moving paths for the first lens group 10 and the second lens group 20 are simply depicted as straight lines in FIG. 6. It should however be noted that actual lens-group-moving paths are not necessarily straight lines.

Focusing is performed by integrally moving the first sub-lens group S1 and the second sub-lens group S2, i.e., the first lens group 10 (first lens group frame 11) regardless of the zooming ranges.

Similar to the first through fifth embodiments, the lens-group-moving paths have discontinuities at the first intermediate focal length fm1 and the second intermediate focal length fm2; however, by adequately determining the positions of the first sub-lens group S1 (first lens group L1), the second sub-lens group S2 (second lens group L2), the third sub-lens group S3 (third lens group L3) and the fourth sub-lens group S4 (fourth lens group L4) respectively at the short focal length extremity fw, the first and second intermediate focal lengths fm1, fm2 (discontinuities), and the long focal length extremity ft, solutions by which an image is correctly formed can be obtained. According to the lens-group-moving paths with the solutions, a zoom lens system which is miniaturized and has a high zoom ratio can be obtained.

Figure 7:
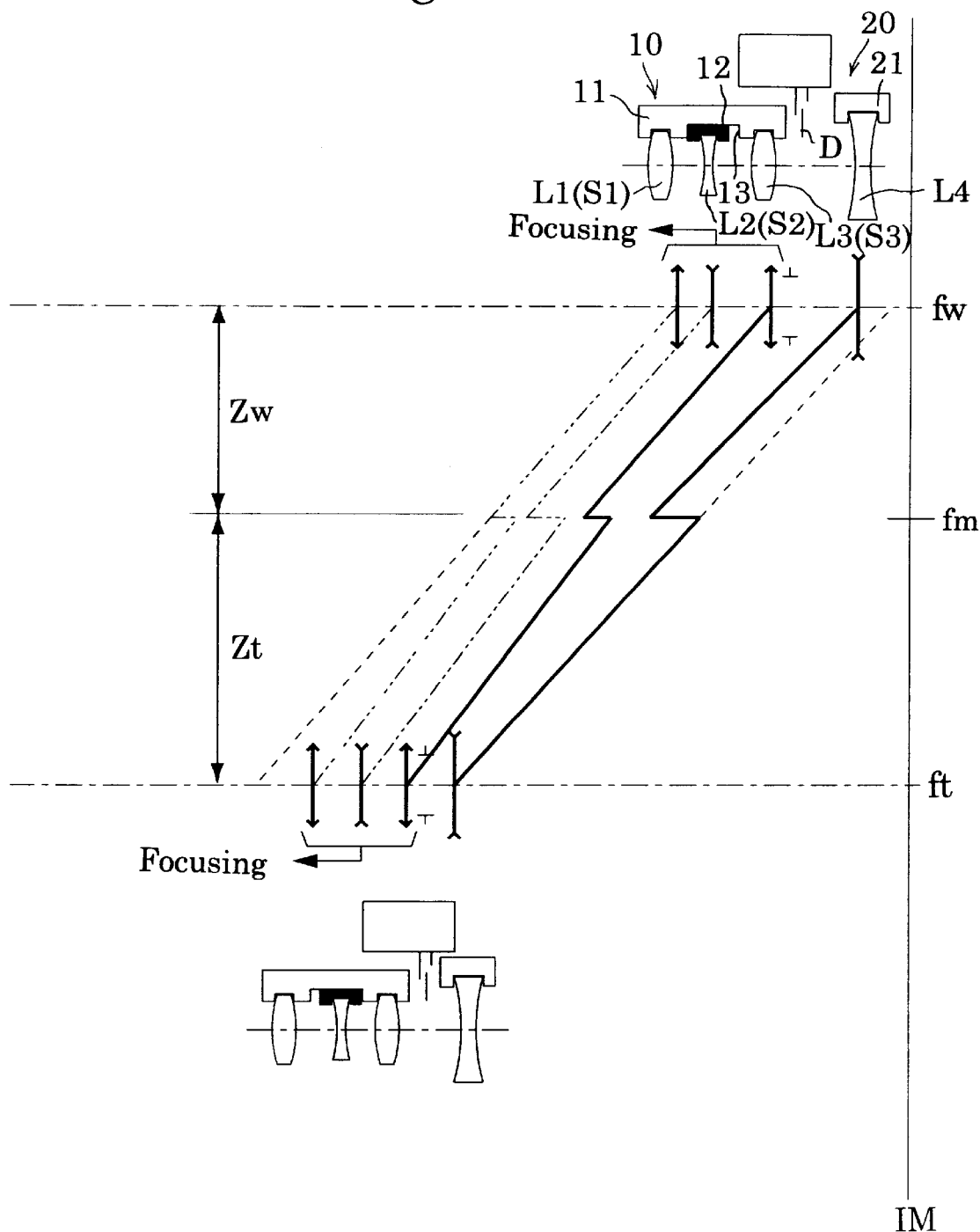
FIG. 7 shows the lens-group-moving paths of the seventh embodiment of the zoom lens system according to the present invention.

FIG. 7 shows the seventh embodiment of the zoom lens system. The zoom lens system includes a positive first lens group 10, and a negative second lens group 20, in this order from the object. The first lens group 10 includes a positive first lens group L1 (first sub-lens group S1), a negative second lens group L2 (second sub-lens group S2) and a positive third lens group L3 (third sub-lens group S3), in this order from the object. The second lens group 20 includes a negative fourth lens group L4. The first sub-lens group S1 and the third sub-lens group S3 are fixed to a first lens group frame 11. The second sub-lens group S2 is mounted on a moveable sub-lens group frame 12. The moveable sub-lens group frame 12 is arranged to move in the optical axis direction, by a predetermined distance, along a guide groove 13 which is formed on the first lens group frame 11. The second sub-lens group S2 is alternatively moved to either the object-side extremity at which the moveable sub-lens group frame 12 comes into contact with the front end of the guide groove 13, or the image-plane-side extremity at which the moveable sub-lens group frame 12 comes into contact with the rear end of the guide groove 13. The fourth lens group L4 of the second lens group 20 is fixed to a second lens group frame 21. The diaphragm D is arranged to move together with the first lens group 10 (first lens group frame 11).

The lens-group-moving paths according to the seventh embodiment enable the first lens group 10 (first lens group frame 11), the second lens group 20 (second lens group frame 21) and the second sub-lens group S2 to move as follows:

[A] In a short-focal-length side zooming range Zw covering the short focal length extremity fw over an intermediate focal length fm, the first sub-lens group S1 and the second sub-lens group S2 maintain a shorter distance therebetween, on the other hand, the second sub-lens group S2 and the third sub-lens group S3 maintain a longer distance therebetween; and the first lens group 10 (first lens group frame 11) and the second lens group 20 (second lens group frame 21) are arranged to move towards the object while the distance therebetween is varied;

[B] At the intermediate focal length fm, the first lens group 10 and the second lens group 20 are moved towards the image plane with respect to the long focal-length-side extremity of the short-focal-length side zooming range Zw; and the second sub-lens group S2 moves to the image-plane-side extremity of the guide groove 13, and thereby the second sub-lens group S2 provides a longer distance with respect to the first sub-lens group S1, and provides a shorter distance with respect to the third sub-lens group S3; and

[C] In a long-focal-length side zooming range Zt covering the long focal length extremity ft over the intermediate focal length fm, the first sub-lens group S1 and the second sub-lens group S2 maintain the longer distance therebetween, and the second sub-lens group S2 and the third sub-lens group S3 maintain the shorter distance therebetween; and the first lens group 10 and the second lens group 20 move towards the object with respect to the positions thereof which are determined, at the intermediate focal length fm, after the lens groups being moving towards the image plane, while the distance therebetween is varied.

The lens-group-moving paths for the first lens group 10 and the second lens group 20 are simply depicted as straight lines in FIG. 7. It should however be noted that actual lens-group-moving paths are not necessarily straight lines.

Focusing is performed by integrally moving the first sub-lens group S1 through the third sub-lens group S3, i.e., the first lens group 10 (first lens group frame 11) regardless of the zooming ranges.

Similar to the first through sixth embodiments, the lens-group-moving paths have discontinuities at the intermediate focal length fm; however, by adequately determining the positions of the first sub-lens group S1 (first lens group L1), the second sub-lens group S2 (second lens group L2), the third sub-lens group S3 (third lens group L3) and the fourth lens group L4 respectively at the short focal length extremity fw, the intermediate focal length fm, (discontinuities) and the long focal length extremity ft, solutions by which an image is correctly formed can be obtained. According to the lens-group-moving paths with the solutions, a zoom lens system which is miniaturized and has a high zoom ratio can be obtained.

Figure 8:
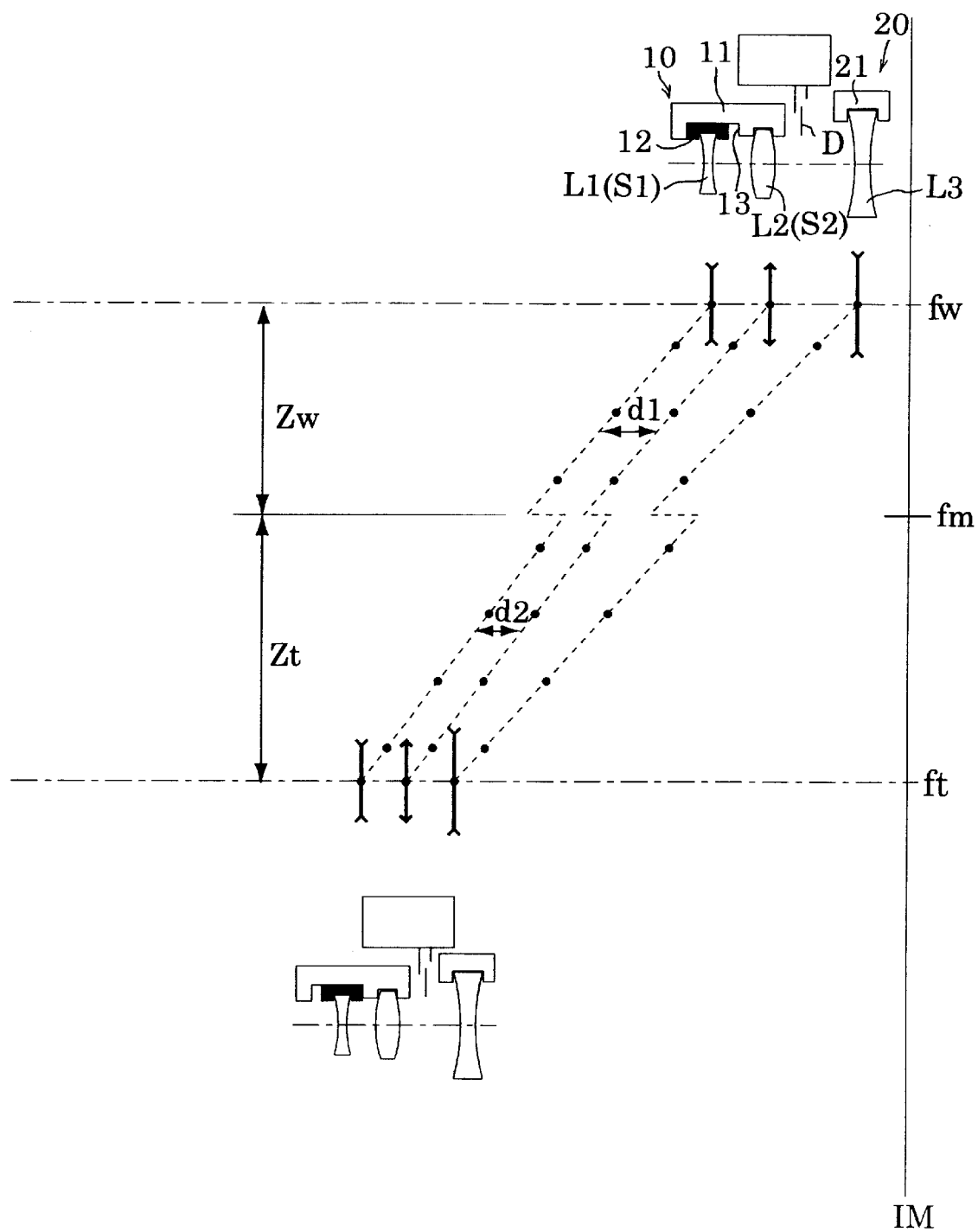
FIG. 8 shows an example on positions at which the lens groups of the zoom lens system stop upon photographing.
Figure 9:
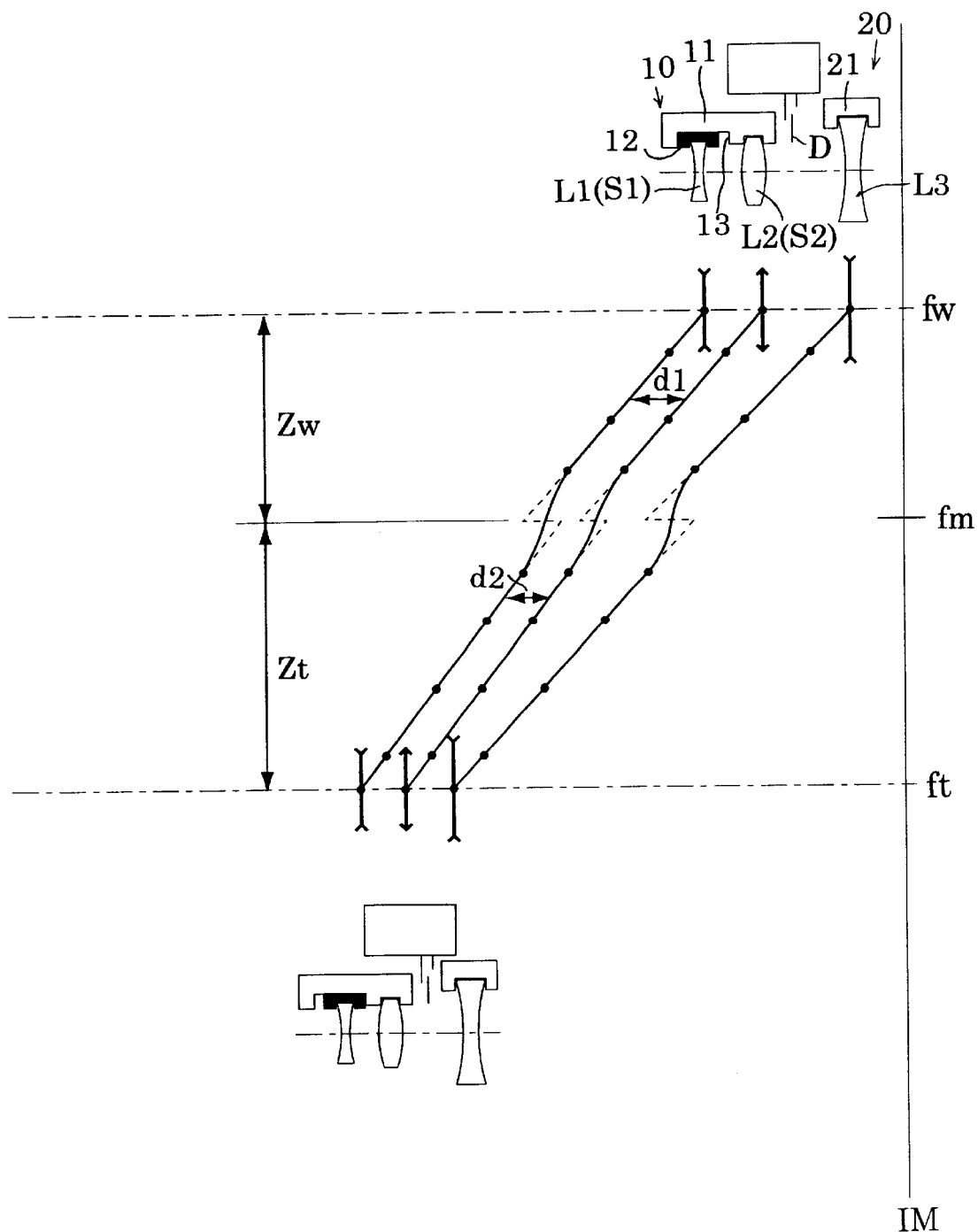
FIG. 9 shows the positions of FIG. 8, and actual lens-group-moving paths of the lens groups of the zoom lens system according to the present invention.

As discussed, it is practical to apply the above-described zoom lens system to a photographing lens system of a camera in which the photographing lens system and a finder optical system are independently provided. Moreover, with respect to each lens group, positions at which the lens group stops upon zooming are preferably determined in a stepwise manner along the lens-group-moving path, i.e., it is preferable to provide a plurality of focal-length steps. FIGS. 8 and 9 show zoom lens systems in which positions for stopping each lens group are determined in a stepwise manner along the lens-group-moving paths. Since these lens systems are the same as that of the first embodiment, the identical components are provided with the same numerals. The lens-group-moving paths are depicted with dotted lines; and positions at which the first lens group frame 11 and the second lens group frame 21 are to be stopped are indicated with black dots along the dotted lines. Further, in FIG. 9, the dots are connected by smooth curved lines. According to an actual mechanical structure, the first lens group frame 11 and the second lens group frame 21 can be moved along such smooth curved lines.

In the embodiments, each lens group is illustrated as a single lens element; however, a lens group can of course include a plurality of lens elements.

According to the above descriptions, a zoom lens system which is miniaturized and has a high zoom ratio can be obtained.

What is claimed is:

1. A zoom lens system comprising a plurality of lens groups which are made relatively moveable in order to vary the focal length of said zoom lens system, wherein at least one of said lens groups is arranged to be a switching lens group which comprises two or more sub-lens groups, and in which one sub-lens group is made moveable, along the optical axis, with respect to the other sub-lens group;

wherein in a first focal-length range of a zooming range of said zoom lens system, said moveable sub-lens group and the other sub-lens group maintain a first distance; and wherein in a second focal-length range which covers said first focal-length range and a range different from said first focal-length range, said moveable sub-lens group and the other sub-lens group maintain a second distance which is different from said first distance.

2. The zoom lens system according to claim 1, wherein when said first distance or said second distance is provided by moving said moveable sub-lens group with respect to the other sub-lens group in said switching lens group, distances among said switching lens group and said other lens groups are varied.

3. The zoom lens system according to claim 1, wherein said plurality of lens groups comprise two lens groups, and wherein a front lens group or a rear lens group of said two lens group comprises said switching lens group.

4. The zoom lens system according to claim 1, wherein said plurality of lens groups comprise three lens groups, and wherein one of said three lens groups comprises said switching lens group.

5. The zoom lens system according to claim 4, wherein a second lens group of said three lens groups comprises said switching lens group.

6. The zoom lens system according to claim 1, wherein said switching lens group is arranged to function as a focusing lens group.

7. The zoom lens system according to claim 1, wherein said zoom lens system has a plurality of said switching lens groups.

8. The zoom lens system according to claim 7, wherein in said switching lens groups, a boundary focal length for changing said first distance to said second distance, or for changing said second distance to said first distance is set equally for all of said switching lens groups.

9. The zoom lens system according to claim 7, wherein in said switching lens groups, a boundary focal length for changing said first distance to said second distance, or for changing said second distance to said first distance is set differently for each of switching lens group.

10. A zoom lens system comprising a negative first lens group, a positive second lens group and a negative third lens group, in this order from an object;
   wherein the entire focal length of said zoom lens system is varied between the long and short focal length extremities of said zoom lens system by varying distances among said lens groups; and
   wherein said first, second and third lens groups are moved along the following lens-group-moving paths:
   [A] in a short-focal-length side zooming range covering the short focal length extremity over an intermediate focal length, said first, second and third lens groups move towards said object, while said first and second lens groups maintain a first distance therebetween, and while a distance between said third lens group and said integrally moved first and second lens groups is varied;
   [B] at said intermediate focal length, said first and second lens groups are moved towards the image plane with respect to a long focal-length-side extremity of said short-focal-length side zooming range, and said first distance is made shorter; and said third lens group moves towards the image plane with respect to said long focal-length-side extremity of said short-focal-length side zooming range; and
   [C] in a long-focal-length side zooming range covering the long focal length extremity over said intermediate focal length, said first, second and third lens groups move towards said object, while a second distance, which is shorter than said first distance, between said first and second lens groups is maintained, and while said distance between said third lens group and said integrally moved first and second lens groups is varied.

11. The zoom lens system according to claim 10, wherein said first and second lens groups comprise a focusing lens group in which regardless of said zooming ranges, said first and second lens groups are arranged to move integrally upon focusing.

12. A zoom lens system comprises a positive first lens group, a negative second lens group, a positive third lens group and a negative fourth lens group, in this order from an object;
   wherein the entire focal length of said zoom lens system is varied between the long and short focal length extremities by varying distances among said lens groups;
   wherein said first, second, third and fourth lens groups are moved along the following lens-group-moving paths:
   [A] in a short-focal-length side zooming range covering the short focal length extremity over an intermediate focal length, said first, second, third and fourth lens groups move towards said object, while said second and third lens groups maintain a first distance therebetween, and while distances among said first lens group, said integrally moved second and third lens groups, and said fourth lens group are varied;
   [B] at said intermediate focal length, said second and third lens groups are moved towards the image plane with respect to a long focal-length-side extremity of said short-focal-length side zooming range, and said first distance is made shorter; and said first and fourth lens groups move towards the image plane with respect to said long focal-length-side extremity of said short-focal-length side zooming range; and
   [C] in a long-focal-length side zooming range covering the long focal length extremity over said intermediate focal length, said first, second, third and fourth lens groups move towards said object, while a second distance, which is shorter than said first distance, between said second and third lens groups is maintained, and while said distances among said first lens group, said integrally moved second and third lens groups, and said fourth lens group are varied.

13. The zoom lens system according to claim 12, wherein said second and third lens groups comprise a focusing lens group in which regardless of said zooming ranges, said second and third lens groups are arranged to move integrally upon focusing.

14. A zoom lens system comprises a negative first lens group, a negative second lens group, a positive third lens group and a negative fourth lens group, in this order from an object;
   wherein the entire focal length of said zoom lens system is varied between the long and short focal length extremities by varying distances among said lens groups; and
   wherein said first, second, third and fourth lens groups are moved along the following lens-group-moving paths:
   [A] in a short-focal-length side zooming range covering the short focal length extremity over an intermediate focal length, said first, second, third and fourth lens groups move towards said object, while said second and third lens groups maintain a first distance therebetween, and while distances among said first lens group, said integrally moved second and third lens groups, and said fourth lens group are varied;
   [B] at said intermediate focal length, said second and third lens groups are moved towards the image plane with respect to a long focal-length-side extremity of said short-focal-length side zooming range, and said first distance is made shorter; and said first and fourth lens groups move towards the image plane with respect to said long focal-length-side extremity of said short-focal-length side zooming range; and
   [C] in a long-focal-length side zooming range covering the long focal length extremity over said intermediate focal length, said first, second, third and fourth lens groups move towards said object, while a second distance, which is shorter than said first distance, between said second and third lens groups is maintained, and while said distances among said first lens group, said integrally moved second and third lens groups, and said fourth lens group are varied.

15. The zoom lens system according to claim 14, wherein said second and third lens groups comprise a focusing lens group in which regardless of said zooming ranges, said second and third lens groups are arranged to move integrally upon focusing.

16. A zoom lens system comprises a negative first lens group, a positive second lens group, a positive third lens group and a negative fourth lens group, in this order from an object;
   wherein the entire focal length of said zoom lens system is varied between the long and short focal length extremities by varying distances among said lens groups; and wherein said first, second, third and fourth lens groups are moved along the following lens-group-moving paths:

[A] in a short-focal-length side zooming range covering the short focal length extremity over an intermediate focal length, said first and second lens groups maintain a longer distance therebetween, and said third and fourth lens groups maintain a longer distance therebetween; and said integrally moved first and second lens groups, and said integrally moved third and fourth lens groups are arranged to move towards said object while a distance therebetween is varied;

[B] at said intermediate focal length, said first and second lens groups are moved towards the image plane with respect to a long-focal-length side extremity of said short-focal-length side zooming range, and said longer distance therebetween is made shorter; and said third and fourth lens groups move towards the image plane with respect to said long-focal-length side extremity of said short-focal-length side zooming range, and said longer distance therebetween is made shorter; and

[C] in a long-focal-length side zooming range covering the long focal length extremity over said intermediate focal length, said first and second lens groups maintain a shorter distance, and said third and fourth lens groups maintain a shorter distance; and said integrally moved first and second lens groups, and said integrally moved third and fourth lens groups are arranged to move towards said object while said distance therebetween is varied.

17. The zoom lens system according to claim 16, wherein said first and second lens groups comprise a focusing lens group in which regardless of said zooming ranges, said first and second lens groups are arranged to move integrally upon focusing.

18. A zoom lens system comprises a negative first lens group, a positive second lens group, a positive third lens group and a negative fourth lens group, in this order from an object;

wherein the entire focal length of said zoom lens system is varied between the long and short focal length extremities by varying distances among said lens groups; and wherein said first, second, third and fourth lens groups are moved along the following lens-group-moving paths:

[A] in a short-focal-length side zooming range covering the short focal length extremity over a first intermediate focal length, said first and second lens groups maintain a longer distance, and said third and fourth lens groups maintain a longer distance; and said integrally moved first and second lens groups, and said integrally moved third and fourth lens groups are arranged to move towards said object while a distance therebetween is varied;

[B] at said first intermediate focal length, said first and second lens groups are moved towards the image plane with respect to a long-focal-length side extremity of said short-focal-length side zooming range, and said longer distance therebetween is made shorter; and said third and fourth lens groups integrally move towards the image plane;

[C] in an intermediate-focal-length zooming range covering said first intermediate focal length over a second intermediate focal length, said first and second lens groups maintain a shorter distance, and said third and fourth lens groups maintain said longer distance, and said integrally moved first and second lens groups, and said integrally moved third and fourth lens groups are arranged to move towards said object while said distance therebetween is varied;

[D] at said second intermediate focal length, said third and fourth lens groups move towards the image plane with respect to said long-focal-length side extremity of said intermediate-focal-length zooming range, and said longer distance therebetween is made shorter; and said first and second lens groups integrally move towards the image plane; and

[E] in a long-focal-length side zooming range covering the long focal length extremity over said second intermediate focal length, said first and second lens groups maintain said shorter distance, and said third and fourth lens groups maintain a shorter distance; and said integrally moved first and second lens groups, and said integrally moved third and fourth lens groups are arranged to move towards said object while said distance therebetween is varied.

19. The zoom lens system according to claim 18, wherein said first and second lens groups comprise a focusing lens group in which regardless of said zooming ranges, said first and second lens groups are arranged to move integrally upon focusing.

20. A zoom lens system comprises a negative first lens group, a positive second lens group, a positive third lens group and a negative fourth lens group, in this order from an object;

wherein the entire focal length of said zoom lens system is varied between the long and short focal length extremities by varying distances among said lens groups; and wherein said first, second, third and fourth lens groups are moved along the following lens-group-moving paths:

[A] in a short-focal-length side zooming range covering the short focal length extremity over a first intermediate focal length, said first and second lens groups maintain a longer distance therebetween, and said third and fourth lens groups maintain a longer distance therebetween; and said integrally moved first and second lens groups, and said integrally moved third and fourth lens groups are arranged to move towards said object while a distance therebetween is varied;

[B] at said first intermediate focal length, said third and fourth lens groups are moved towards the image plane with respect to a long focal-length-side extremity of said short-focal-length side zooming range, and said longer distance therebetween is made shorter; and said first and second lens groups integrally move towards the image plane;

[C] in an intermediate-focal-length zooming range covering said first intermediate focal length over a second intermediate focal length, said first and second lens groups maintain said longer distance therebetween, and said third and fourth lens groups maintain a shorter distance therebetween; and said integrally moved first and second lens groups, and said integrally moved third and fourth lens groups are arranged to move towards said object while said distance therebetween is varied;

[D] at said second intermediate focal length, said first and second lens groups move towards the image plane with respect to said long-focal-length side extremity of said intermediate-focal-length zooming range, and said longer distance therebetween is made shorter; and said third and fourth lens groups integrally move towards the image plane; and

[E] in a long-focal-length side zooming range covering the long focal length extremity over said second intermediate focal length, said first and second lens groups maintain a shorter distance therebetween, and said third and fourth lens groups maintain said shorter distance therebetween; and said integrally moved first and second lens groups, and said integrally moved third and fourth lens groups are arranged to move towards said object while said distance therebetween is varied.

21. The zoom lens system according to claim 20, wherein said first and second lens groups comprise a focusing lens group in which regardless of said zooming ranges, said first and second lens groups are arranged to move integrally upon focusing.

22. A zoom lens system comprises a positive first lens group, a negative second lens group, a positive third lens group and a negative fourth lens group, in this order from an object;

wherein the entire focal length of said zoom lens system is varied between the long and short focal length extremities by varying distances among said lens groups; and wherein said first, second, third and fourth lens groups are moved along the following lens-group-moving paths:

[A] in a short-focal-length side zooming range covering the short focal length extremity over an intermediate focal length, said first and second lens groups maintain a shorter distance therebetween, and said second and third lens groups maintain a longer distance therebetween; and said integrally moved first, second and third lens groups, and said fourth lens group are arranged to move towards said object while a distance therebetween is varied;

[B] at said intermediate focal length, said second lens group moves towards the image plane, and thereby said distance between said first and second lens groups is made longer, and said distance between said second and third lens groups is made shorter; and

[C] in a long-focal-length side zooming range covering the long focal length extremity over said intermediate focal length, said first and second lens groups maintain said longer distance, and said second and third lens groups maintain said shorter distance; and said integrally moved first, second and third lens groups, and said fourth lens group are arranged to move towards said object while said distance therebetween is varied.

23. The zoom lens system according to claim 22, wherein said first through third lens groups comprise a focusing lens group in which regardless of said zooming ranges, said first through third lens groups are arranged to move integrally upon focusing.

24. The zoom lens system according to claim 1, wherein said zoom lens system is used as a photographing lens system of a camera in which said photographing lens system and a finder optical system are independently provided.

25. The zoom lens system according to claim 24, wherein with respect to each of said lens groups, positions at which said lens group stops upon zooming are determined in a stepwise manner along said lens-group-moving path.

26. A zoom lens system comprising a plurality of lens groups being relatively moveable upon zooming;

wherein at least one lens group comprises a plurality of sub-lens groups, one of which is made moveable, along the optical axis, to be selectively positioned at one of extremities of a range within which said moveable sub-lens group is allowed to move, with respect to other sub-lens groups;

wherein in a short-focal-length side zooming range covering the short focal length extremity over an intermediate focal length, said moveable sub-lens group is arranged to position at one of said extremities;

wherein in a long-focal-length side zooming range covering the long focal length extremity over said intermediate focal length, said moveable sub-lens group is arranged to position at the other of said extremities;

wherein lens-group-moving paths of said lens group containing said plural sub-lens groups, and those of other lens groups are discontinued at said intermediate focal length; and wherein said zoom lens system is arranged to form an image on the image plane in accordance with a position of said moveable sub-lens group.

27. A zoom lens system comprising a plurality of lens groups being relatively moveable in order to vary the focal length of said zoom lens system;

wherein at least one lens group is arranged to be a switching lens group which comprises two or more sub-lens groups, and in which one sub-lens group is made moveable, along the optical axis, towards one of an object-side and image-plane-side extremities with respect to the other sub-lens group;

wherein in a short-focal-length side zooming range covering the short focal length extremity over an intermediate focal length, said switching lens group and other lens groups are moved towards an object, and distances thereamong are varied, while said moveable sub-lens group remains stationary at said object-side extremity;

wherein at said intermediate focal length, said moveable sub-lens group is moved to said image-plane-side extremity, and at the same time, said switching lens group and other lens groups are respectively moved towards the image plane;

wherein in a long-focal-length side zooming range covering the long focal length extremity over said intermediate focal length, said switching lens group and other lens groups are moved towards said object, and said distances thereamong are varied, while said moveable sub-lens group remains stationary at said image-plane-side extremity.

28. A zoom lens system comprising a plurality of lens groups being relatively moveable in order to vary the focal length of said zoom lens system;

wherein a plurality of lens groups of said plural lens groups are arranged to be switching lens groups, each of which comprises two or more sub-lens groups;

wherein in each switching lens group, one sub-lens group is made moveable, along the optical axis, towards one of an object-side and image-plane-side extremities with respect to the other sub-lens group;

wherein at the short focal length extremity, all of said moveable sub-lens groups in said switching lens groups are positioned at said object-side extremity;

wherein at a plurality of intermediate focal lengths between the short and long focal length extremities, said moveable sub-lens groups are moved, one by one, from said object-side extremity to said image-planeside extremity, and at the same time, said switching lens groups and said other lens groups are moved towards an image plane; and wherein in the following zooming ranges, said switching lens groups and said other lens groups are moved towards said object while distances among said lens groups are varied:
(i) from the short focal length extremity to a first intermediate focal length;
(ii) along a plurality of said intermediate focal lengths; and
(iii) from the last intermediate focal length to the long focal length extremity.

29. The zoom lens system according to claim 28, wherein all of said lens groups of the zoom lens system comprise said switching lens groups.

30. The zoom lens system according to claim 29, wherein the number of said lens group is two.

31. The zoom lens system according to claim 25, wherein said positions at which said lens group stops are determined so that said positions do not coincide with a boundary focal length for changing said first distance in said switching lens group to said second distance thereof, or for changing said second distance to said first distance.

* * * * *